(12) United States Patent
Freese

(10) Patent No.: US 11,089,795 B1
(45) Date of Patent: Aug. 17, 2021

(54) BREWING COFFEE WITH A PRECISE NATURALLY-OCCURRING CAFFEINE CONTENT

(71) Applicant: Taika Inc., San Francisco, CA (US)

(72) Inventor: Kalle Freese, San Francisco, CA (US)

(73) Assignee: Taika, Inc., San Francisco, CA (US)

( * ) Notice: Subject to any disclaimer, the term of this patent is extended or adjusted under 35 U.S.C. 154(b) by 0 days.

(21) Appl. No.: 16/634,130

(22) PCT Filed: Oct. 18, 2019

(86) PCT No.: PCT/US2019/057054
§ 371 (c)(1),
(2) Date: Jan. 24, 2020

(87) PCT Pub. No.: WO2020/082014
PCT Pub. Date: Apr. 23, 2020

Related U.S. Application Data

(60) Provisional application No. 62/747,139, filed on Oct. 18, 2018.

(51) Int. Cl.
| | | |
|---|---|---|
| A23F 5/26 | (2006.01) |
| A47J 31/00 | (2006.01) |
| A47J 31/44 | (2006.01) |
| A47J 31/06 | (2006.01) |
| A47J 31/42 | (2006.01) |
| A47G 19/14 | (2006.01) |

(52) U.S. Cl.
CPC ............. *A23F 5/267* (2013.01); *A47J 31/002* (2013.01); *A47J 31/06* (2013.01); *A47J 31/42* (2013.01); *A47J 31/44* (2013.01); *A47G 19/14* (2013.01)

(58) Field of Classification Search
CPC ......... A23F 5/267; A47J 31/002; A47J 31/06; A47J 31/42; A47J 31/44; A47G 19/14
See application file for complete search history.

(56) References Cited

U.S. PATENT DOCUMENTS 4,007,290 A * 2/1977 Zeitlin ................. A23F 3/363
426/594
4,081,561 A * 3/1978 Meyer .................. A23F 5/208
426/385

(Continued)

FOREIGN PATENT DOCUMENTS

KR 20150025040 * 3/2015

OTHER PUBLICATIONS

International Search Report and Written Opinion in PCT International Application No. PCT/US2019/057054, dated Jan. 3, 2020.

*Primary Examiner* — Anthony J Weier
(74) *Attorney, Agent, or Firm* — Cognition IP, P.C.; Edward Steakley

(57) ABSTRACT

Coffee having a precisely calculated caffeine content is created by brewing a caffeinated and decaffeinated portion of coffee. The caffeine levels of the caffeinated and decaffeinated coffee may be precisely measured using scientific, industrial, or electronic equipment. Moreover, a target caffeine level is determined. A proportion between the caffeinated and decaffeinated coffee may be determined to obtain the target caffeine level. The caffeinated and decaffeinated coffee may be blended according to the proportion to obtain coffee having the target caffeine level.

21 Claims, 4 Drawing Sheets

(56) References Cited

U.S. PATENT DOCUMENTS

| | | | |
|---|---|---|---|
| 4,508,743 A * | 4/1985 | Green | A23F 5/208 |
| | | | 426/422 |
| 5,207,148 A | 5/1993 | Anderson et al. | |
| 6,808,731 B1 | 10/2004 | Gutwein et al. | |
| 2009/0098253 A1 * | 4/2009 | Diaz Blanco | B65D 85/8043 |
| | | | 426/82 |
| 2009/0214716 A1 * | 8/2009 | Shapira | A23F 5/16 |
| | | | 426/87 |
| 2012/0269913 A1 | 10/2012 | Chu et al. | |
| 2014/0370181 A1 * | 12/2014 | Young | A23F 5/12 |
| | | | 426/595 |
| 2016/0235084 A1 | 8/2016 | Gamay | |

* cited by examiner

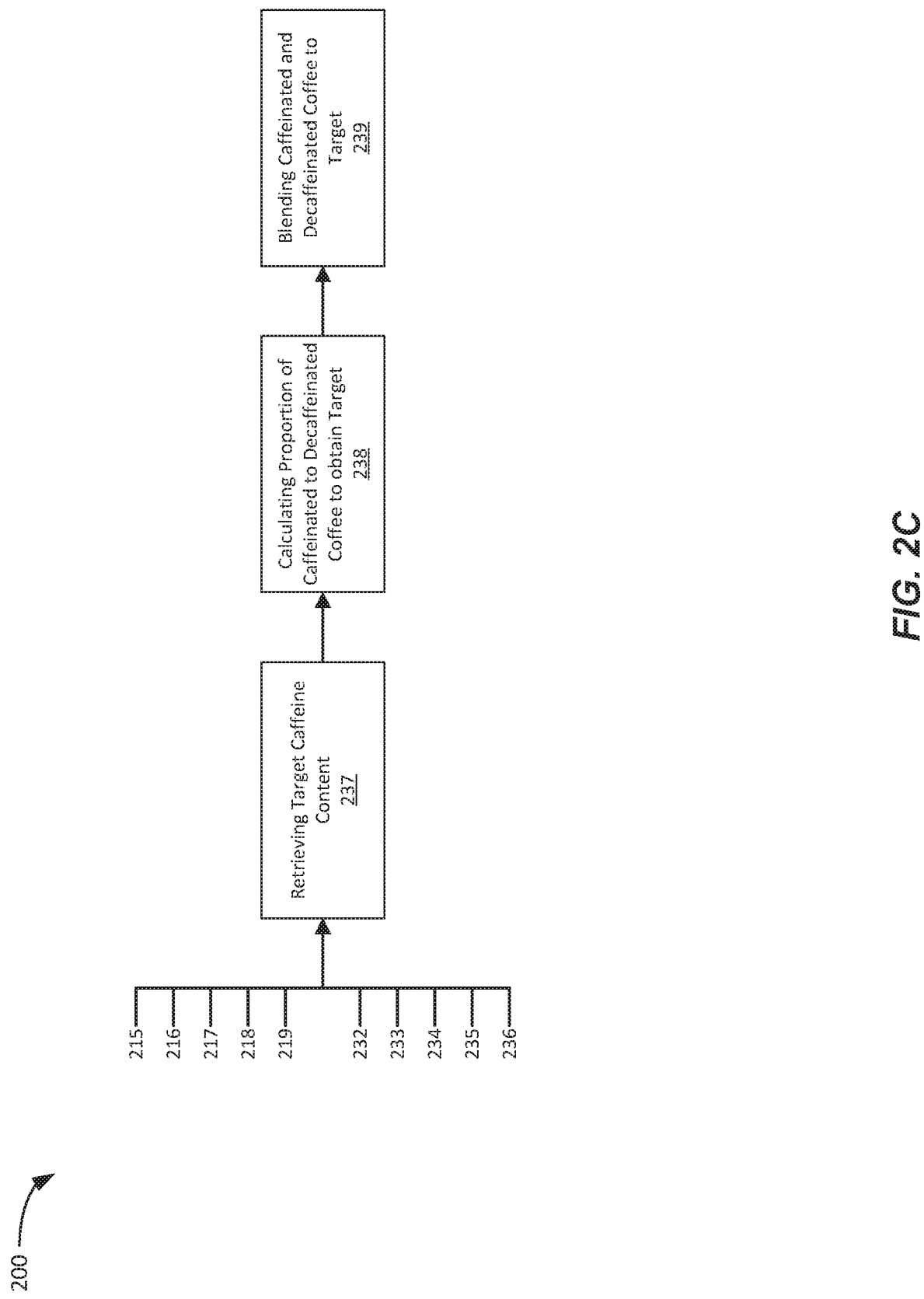

BREWING COFFEE WITH A PRECISE NATURALLY-OCCURRING CAFFEINE CONTENT

CROSS-REFERENCE TO RELATED APPLICATIONS

This application is a 35 U.S.C. § 371 national stage application of PCT International Application No. PCT/US19/57054, filed on Oct. 18, 2019, which claims the benefit of U.S. Provisional Application No. 62/747,139, filed on Oct. 18, 2018, both of which are hereby incorporated by reference in their entirety.

BACKGROUND

Current caffeine options among coffees are generally binary. One option is "regular" (full caffeine) and the other option is "decaffeinated" or "decaf" for short. In regular coffee, the amount of caffeine can vary greatly based on the origin, variety, coffee species, brew method, and cup size. As a result, coffee drinkers who want a caffeinated beverage do not have a way of drinking coffee and knowing the exact amount of caffeine that they are ingesting. It is generally desired by many coffee drinkers to maximize the health benefits provided by coffee, such as and reduce or regulate the amount of caffeine consumed.

Regular coffee drinkers often become highly sensitized to caffeine and may need to carefully regulate their caffeine levels. In addition, many coffee drinkers have health conditions that limit their caffeine tolerance and force them to reduce caffeine intake. Pregnant and nursing women may also need to reduce their caffeine intake. Moreover, regular coffee drinkers may suffer from a number of side effects, such as headaches, anxiety, jitters, insomnia, or heart palpitations if they have too much or too little caffeine. The current binary options between regular coffee and decaffeinated coffee are not suitable for these individuals.

Half-caf coffee is one existing option and blends 50/50 decaffeinated and caffeinated coffee, but is not a solution. Because the caffeine levels in regular coffee are themselves highly inconsistent, the caffeine level in half-caf coffee is also highly variable and not precise. Half-caf does not address the need among regular coffee drinkers to precisely regulate their caffeine intact.

In other drinks aside from coffee, more targeted amounts of caffeine may be obtained by starting with a drink that has no naturally occurring caffeine, like an energy drink, and artificially adding caffeine to it, such as with caffeine powder or crystals. This approach is not suitable for coffee, which includes natural caffeine already, and would also require listing caffeine as an additive if caffeine were artificially added to meet a target quantity. Adding more caffeine would not account for the caffeine already in the drink. It would be more desirable to be able to precisely regulate the amount of natural caffeine in a cup of coffee so that coffee drinkers could drink coffee knowing the exact amount of caffeine in the coffee.

BRIEF SUMMARY

One embodiment relates to a process for brewing coffee with a precise measurement of naturally occurring caffeine in coffee. In one aspect, a portion of caffeinated coffee is brewed and a portion of decaffeinated coffee is brewed. The caffeine content in the caffeinated coffee and decaffeinated coffee may be measured by scientific, industrial, or electronic equipment such as spectrophotometry, high performance liquid chromatography, gas chromatography, mass spectrometry, or other methods. Once the caffeine content in each has been measured to a high degree of accuracy, they may then be blended in precisely calculated proportion to obtain a blended portion of coffee that has a highly precisely amount of caffeine. In some embodiments, only the caffeine content of the caffeinated coffee is measured and the decaffeinated coffee may be assumed to have virtually no caffeine. In one embodiment, a method of creating coffee with a highly precise amount of caffeine is disclosed. The method may include extracting a portion of caffeinated coffee and extracting a portion of decaffeinated coffee. The method may include measuring the caffeine content of the caffeinated coffee to a high degree of accuracy and measuring the caffeine content of the decaffeinated coffee to high degree of accuracy. The method may include retrieving a target caffeine content. The method may include blending the caffeinated coffee and decaffeinated coffee in a proportion to create a blend having the target caffeine content, where the target caffeine content is achieved with a high degree of accuracy.

Another advantage in some embodiments is using a separate brewing process for the caffeinated and decaffeinated coffee, which allows setting the coffee extraction and preparation parameters specifically for the specific caffeinated or decaffeinated coffees, as opposed to using the same parameters for both. Decaffeinated and caffeinated coffee beans generally extract in terms of flavor, bio- and psychoactive compounds such as caffeine) at different rates. Therefore, extracting the two coffees separately with parameters customized for each may achieve more uniform and better tasting coffee.

The above description is exemplary only and other disclosed embodiments may omit or add steps or perform steps in different orders. Additional embodiments herein will be made clear from the detailed disclosure.

BRIEF DESCRIPTION OF THE DRAWINGS

FIGS. 2A, 2B, and 2C illustrate another exemplary method of brewing coffee with a desired caffeine content.

DETAILED DESCRIPTION

Figure 1:
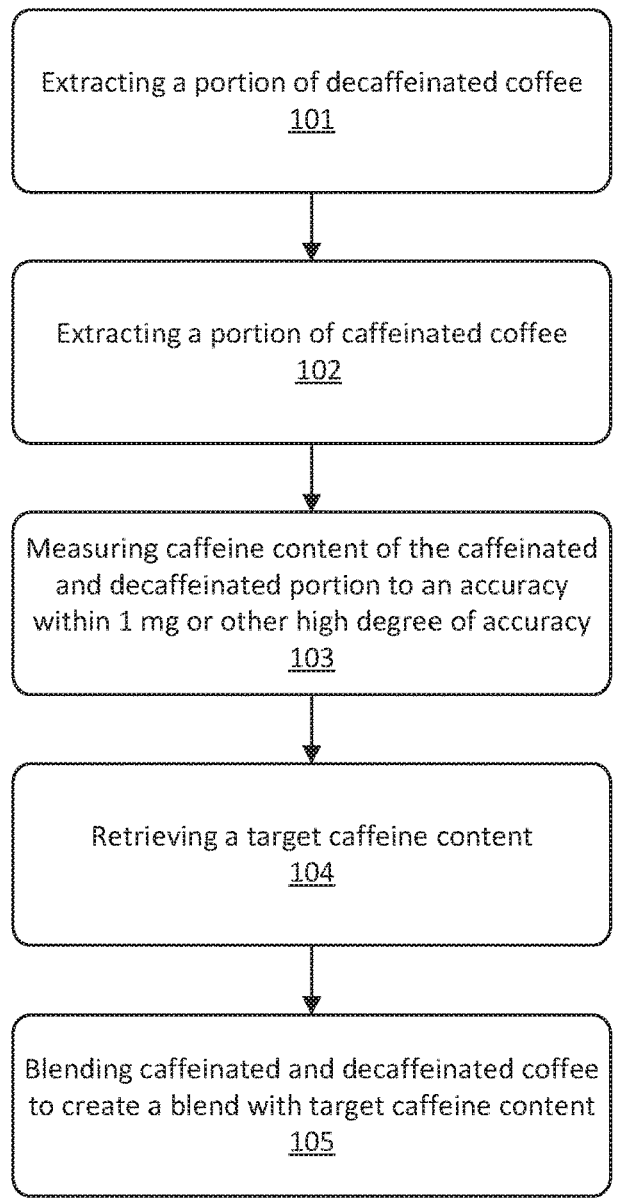
FIG. 1 illustrates an exemplary method of brewing coffee with a desired caffeine content.

In this specification, reference is made in detail to specific embodiments of the invention. Some of the embodiments or their aspects are illustrated in the drawings. For clarity in explanation, the method has been described with reference to specific embodiments, however it should be understood that the method is not limited to the described embodiments. On the contrary, the method covers alternatives, modifications, and equivalents as may be included within its scope as defined by any patent claims. The following embodiments of the method are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the method.

In addition, it should be understood that steps of the exemplary methods set forth in this exemplary patent can be performed in different orders than the order presented in this specification. Furthermore, some steps of the exemplary methods may be performed in parallel rather than being performed sequentially.

Caffeine is the most widely consumed stimulant to counter the effects of sleep deprivation on alertness. It is generally desired to consume both the safest and most effective coffee, which requires the right amount and right time of consumption. The following discussion describes a system that optimizes caffeine consumption while safely maximizing alertness at the desired time of the day.

FIG. 1 illustrates an exemplary method 100 of brewing coffee. A first portion of decaffeinated coffee 101 is extracted. The extraction may use cold brew methods, other full immersion methods, percolation, or other coffee brewing methods. A cold brew method enables the coffee to brew without heat, by allowing the flavor and oil molecules from the coffee grounds to be extracted through osmosis over a number of hours. The time can be as short as one hour to as long as more than 24 hours. After the flavor and oil molecules have been extracted through osmosis, the coffee is then filtered to discard the coffee grounds. Other full immersion methods, aside from cold brew, may also be used. In an exemplary full immersion method all of the water and all of the coffee are in contact with each other. One example is a French Press, wherein the coffee grounds may be placed directly in water in a French Press vessel, before using the press to push the coffee grounds through a filter. Percolation may also be used, where water travels through a bed of coffee and the entirety of the water and entirety of the coffee are not in contact at any point. For example, a percolator may be filled with water and the coffee grounds and filter basket then deposited into the percolator. Heat is applied to brew the coffee. Other percolation methods could also be used.

In step 102, a second portion of caffeinated coffee is extracted. The extraction may use any method of coffee extraction, such as described above. The caffeinated and decaffeinated coffees may be of the same type, or may differ in origin, variety, coffee species, brew method, or other parameters.

In step 103, the caffeine content in both portions of coffee are then measured for caffeine concentration. The measurement may be within an accuracy, such as margin of error, of plus or minus 10 milligrams, 5 milligrams, 2 milligrams, 1 milligram, 0.5 milligrams, 0.25 milligrams, 0.1 milligrams, 0.05 milligrams, 0.01 milligrams, 0.001 milligrams, 0.0001 milligrams, 0.00001 milligrams, 0.000001 milligrams, or even further accurate. In some embodiments, the measurement is within a margin of error of 10%, 5%, 2%, 1%, 0.5%, 0.1%, 0.01%, 0.001%, 0.0001%, 0.00001%, 0.000001%, or even more accurate. These margins of error may be obtained for an entire batch of coffee or per single serving of coffee (such as per cup or bottle). In some embodiments, the level of accuracy may be configurable.

In step 104, a target caffeine amount is then determined. This caffeine amount can range from 0 mg of caffeine to over 160 mg of caffeine, depending on the target caffeine concentration. In some embodiments, the target caffeine amount can be configured by a user. For example, in some embodiments the target amount of caffeine may be received as input from a user so that the amount of caffeine may be configured precisely per cup, drink, or portion. In other embodiments, the target caffeine amount may be determined by analysis of customer demand. In some embodiments, the target caffeine amount may be determined based on the caffeine sensitivity of a target market segment. The target caffeine amount may also be determined by customer survey data collection.

In step 105, the first and second portions of coffee are blended together into a single vessel from calculated respective proportions to retrieve a target caffeine concentration. The proportions of the first and second portions of coffee to combined may be calculated to obtain the target caffeine concentration with a high degree of accuracy. For example, the target concentration may be achieved with an accuracy, such as margin of error, of plus or minus 10 milligrams, 5 milligrams, 2 milligrams, 1 milligram, 0.5 milligrams, 0.25 milligrams, 0.1 milligrams, 0.05 milligrams, 0.01 milligrams, 0.001 milligrams, 0.0001 milligrams, 0.00001 milligrams, 0.000001 milligrams, or even further accurate. In some embodiments, the target concentration may be achieved within a margin of error of 10%, 5%, 2%, 1%, 0.5%, 0.1%, 0.01%, 0.001%, 0.0001%, 0.00001%, 0.000001%, or even more accurate. These margins of error may be obtained for an entire batch of coffee or per single serving of coffee (such as per cup or bottle). In some embodiments, the level of accuracy may be configurable.

The method of blending may use a centrifugal force blending machine, a combining of both portions into a common covered vessel and then mechanically shaking the vessel, a combining of both portions into a common covered vessel and then mechanically stirring the vessel, or any other blending method. These blending methods are preferably implemented by using a machine. The blend may be further processed into a ready-to-drink beverage or a powder, such as a soluble coffee of coffee grounds, or other coffee forms.

Figure 2A:
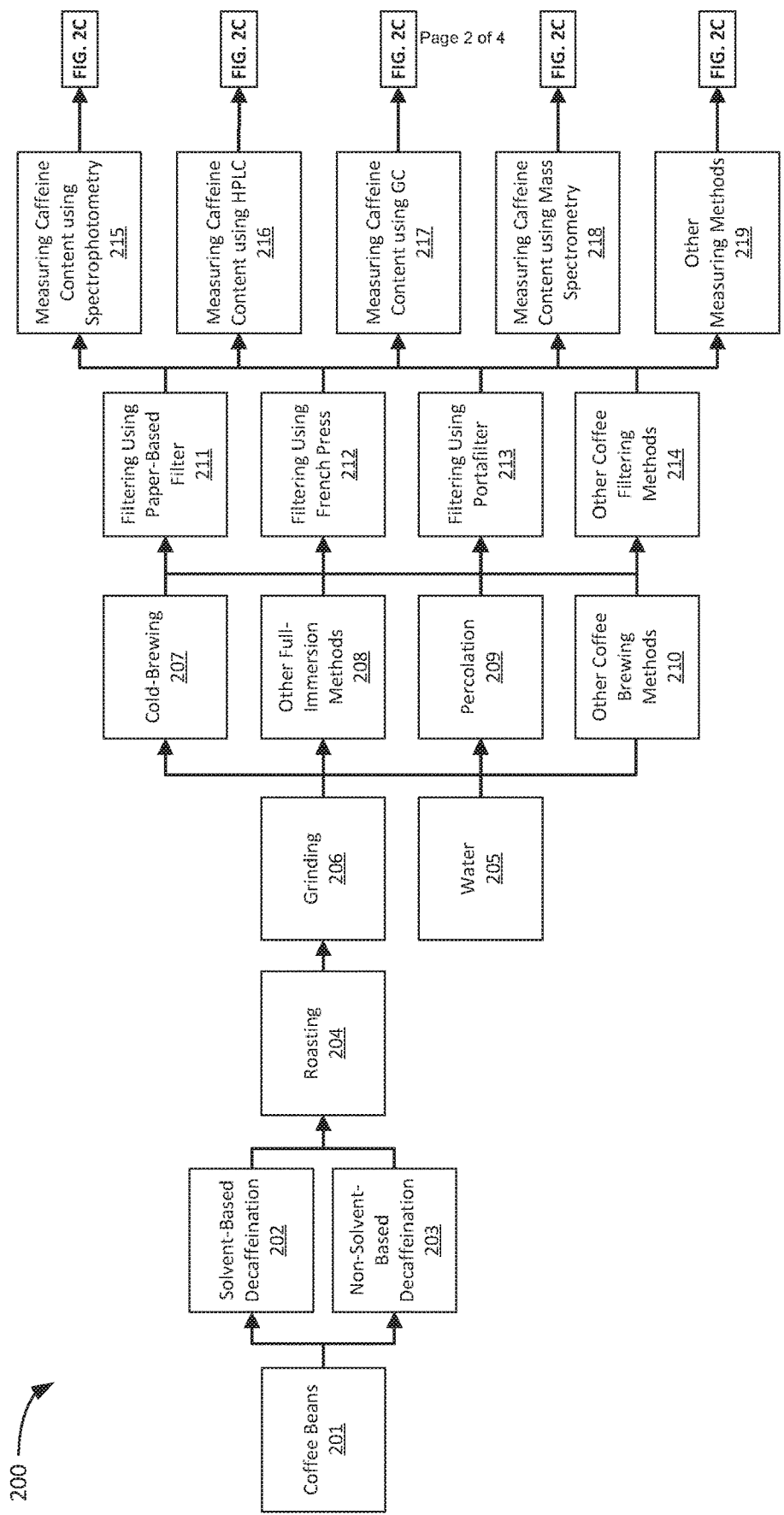
Figure 2B:
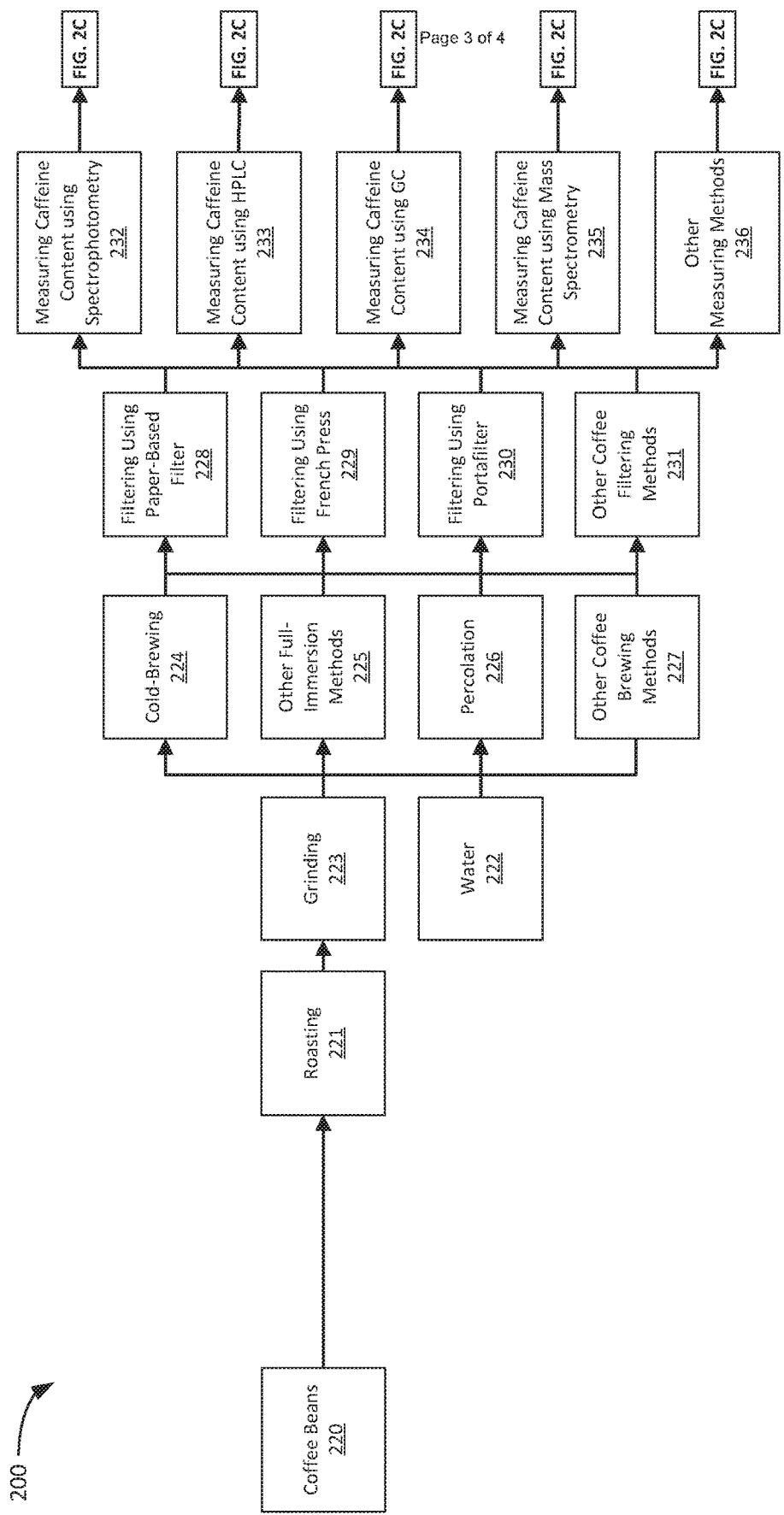

FIGS. 2A-C illustrate another exemplary method 200 of brewing coffee. In one example, starting at FIG. 2A, a first plurality of ground coffee beans 201 is combined with water and decaffeinated. In one embodiment, the coffee may be decaffeinated using solvent-based decaffeination (step 202). The solvent-based decaffeination 202 may employ an indirect-solvent process or direct-solvent process. The chemical solvent in the solvent-based decaffeination step 202 may be methylene chloride or ethyl acetate or another solvent. In an exemplary direct-solvent process, caffeine is removed by soaking the unroasted beans directly in a solvent. In an exemplary indirect-solvent process, the unroasted coffee beans soak in hot water for several hours. The beans are then drained and the water is combined with a solvent to absorb the caffeine. The solvent is then filtered from the rest of the water. The water is then returned to the beans, where they soak more to absorb the flavor substances.

Alternatively, the coffee may be decaffeinated using non-solvent based decaffeination (step 203). The non-solvent based decaffeination method 203 may employ either the Swiss Water Process (SWP), also known as the SWP method, Activated Charcoal Decaffeination, Dihydro-oxide Process, or other processes. In an exemplary SWP method, the coffee beans are soaked in a solution of green coffee extract (because unroasted coffee beans are green), which is comprised of water as well as flavor and oil molecules. The solution is in a state of equilibrium with all of the components of coffee except for the caffeine. The water is then filtered through an activated charcoal filter which captures caffeine molecules but permits flavor and oil molecules, responsible for coffee's flavor, to pass through. The coffee beans are discarded, but the caffeine-free water is used to decaffeinate new coffee beans. Because the water is already concentrated with oil and flavor molecules, the new coffee beans discard only their caffeine molecules but retain oil and flavor molecules. Another non-solvent based decaffeination is the $CO_2$ process Method, also known as the Carbon Dioxide Method, Liquid Carbon Dioxide Method, or Supercritical Carbon Dioxide Method. In an exemplary $CO_2$ decaffeination process, coffee beans are first soaked in water and then deposited into an extraction vessel. The extractor is sealed and liquid $CO_2$ is deposited into the coffee beans at a high pressure, such as 1,000 lbs per square inch. The $CO_2$ performs the function of a solvent and dissolves the caffeine in the coffee beans. The coffee beans retain their flavor and oil molecules. The $CO_2$ is then transformed to a gas in am absorption chamber and discards the caffeine molecules. The $CO_2$ can be recycled to decaffeinate more coffee beans.

In step 204, the decaffeinated coffee beans are roasted 204, ground 206, combined with water 205, and then brewed. The coffee beans 201 and water 205 may be brewed through a cold brew method 207, other full immersion methods 208, percolation 209 or other coffee brewing methods 210. The water may contain mineral salts or other solutes, such as magnesium and calcium. In some embodiments, the first plurality of coffee beans may be homogeneous. For instance, the beans may all have the same origin, come from the same variety of coffee plant, and be subjected to the same roasting process. In alternative embodiments, the first plurality of coffee beans may be heterogeneous in constitution, with different origins, varieties, or roasts present in the overall blend.

In steps 211-214, the brewed coffee is filtered. The brewed coffee may be filtered through a paper-based filter 211, a French press 212, a portafilter 213, or other coffee filtering methods 214. Any method of brewing may be used with any method of filtering.

In steps 215-219, the filtered decaffeinated coffee is measured precisely to evaluate its caffeine concentration. The measurement method may use spectrophotometry 215, which, in an exemplary approach, may measure the concentration of solutes in a solution by measuring the amount of the light that is absorbed by the solution. The measurement method may use high performance liquid chromatography 216, which, in an exemplary approach, may utilize pumps to disperse a pressurized liquid solvent that contains the sample mixture through a column filled with solid adsorbent material. The measurement method may use gas chromatography 217, wherein, in an exemplary approach, a chromatograph is injected with compounds and flash evaporated onto a column. Compounds are injected onto the gas chromatograph and flash evaporated onto the packed or capillary column. The measurement method may also use mass spectrometry 218. In an exemplary approach, chemical species are ionized and sorted based on their mass-to-charge ratio. Other measurement methods 219 may also be used. Any measurement method may be used with any method of filtering and any method of brewing.

These same measurement methods as well as other methods may also be used to measure the caffeine concentration in the caffeinated coffee 232-236.

In an alternative embodiment, the decaffeinated coffee is not measured for caffeine concentration. In some embodiments for creating decaffeinated coffee, the decaffeination may remove virtually all the caffeine such that the resulting decaffeinated coffee has approximately no caffeine. Thus, it is possible to blend decaffeinated and caffeinated coffee in particular proportion to obtain a target caffeine concentration 239 based on determining the caffeine content of the caffeinated coffee alone and without measuring the caffeine concentration of the decaffeinated coffee 215-219.

Continuing at FIG. 2B, steps 220-236 may be similar or identical to steps 201-219, to obtain the second portion of brewed coffee, which may comprise regular caffeinated coffee. The decaffeination step is not performed. The caffeinated and decaffeinated coffees may be of the same type, or may differ in origin, variety, coffee species, brew method, or other parameters. Both portions of coffee may then be measured for caffeine concentration. Alternatively, only the caffeinated coffee is measured for caffeine concentration and the decaffeinated coffee is assigned a caffeine content of 0 mg. The measurement may be within an accuracy, such as margin of error, of plus or minus 10 milligrams, 5 milligrams, 2 milligrams, 1 milligram, 0.5 milligrams, 0.25 milligrams, 0.1 milligrams, 0.05 milligrams, 0.01 milligrams, 0.001 milligrams, 0.0001 milligrams, 0.00001 milligrams, 0.000001 milligrams, or even further accurate. In some embodiments, the measurement is within a margin of error of 10%, 5%, 2%, 1%, 0.5%, 0.1%, 0.01%, 0.001%, 0.0001%, 0.00001%, 0.000001%, or even more accurate. These margins of error may be obtained for an entire batch of coffee or per single serving of coffee (such as per cup or bottle). In some embodiments, the level of accuracy may be configurable.

In step 237, a target caffeine amount is then determined. This caffeine amount can range from 0.0 mg/ml of caffeine to over 1.0 mg/ml of caffeine, depending on the target caffeine concentration. For example, the caffeinated amount can be about 0.705 mg/ml and the decaffeinated amount can be about 0.019 mg/ml. The target caffeine content may be determined using any of the methods described with respect to step 104 or elsewhere herein.

In step 238, the proportions of caffeinated and decaffeinated coffee necessary to blend together to retrieve a target caffeine concentration are calculated. The calculation is preferably performed using a computer system, but may also use other methods of calculation such as a digital calculator, an analog calculator, paper and pencil, a computer, digital software, or any other calculation tool used to perform mathematical calculations. The proportions can range from less than 1% decaffeinated to more than 99% decaffeinated and from less than 1% caffeinated to more than 99% caffeinated to achieve the target caffeine concentration.

In step 239, the first and second portions of coffee are blended together into a single vessel from the calculated respective proportions to retrieve a target caffeine concentration. The method of blending may use a centrifugal force blending machine, a combining of both portions into a common covered vessel and then shaking the vessel, a combining of both portions into a common covered vessel and then stirring the vessel, or any other blending method. The blend may be further processed into a ready-to-drink beverage or a powder, such as a soluble coffee or coffee grounds, or other coffee forms.

In an alternative embodiment, the decaffeinated coffee grounds 206 and caffeinated coffee ground 223 portions are combined into a mixture of grounds with a desired caffeine content. After the coffee beans are ground, the decaffeinated coffee grounds are measured 215-219 and the caffeinated coffee grounds are also measured 232-236 for their caffeine concentration using any of the methods described herein. Continuing at FIG. 2C, a target caffeine concentration is retrieved 237 and particular proportions of the decaffeinated coffee grounds 206 and caffeinated coffee grounds 223 are calculated 238 and combined to make a mixture of coffee grounds that has the target caffeine concentration 239. The mixture of coffee grounds may then be brewed to make a portion of coffee having the target caffeine concentration 239.

In some embodiments, methods 100 and 200 are implemented using a computer-controlled industrial process and each of the steps are performed using one or more pieces of machinery. In some embodiments, a central computer may control each of the steps and the transition of the coffee from each step to the next.

The types of coffee that may be created by methods 100 and 200 include, but are not limited to, regular coffee, cold brew, cappuccino, americano, espresso, macchiato, mocha, latte, and others. In some embodiments, a cold brew coffee created using the methods herein may be created and canned or bottled for sale as single-serving or multi-serving containers. In some embodiments, the coffee created through this method could be sold in cafes, diners, and restaurants where customers purchase by the cup, mug, or pot. In one embodiment, various target levels of caffeine may be selected, and coffee may be brewed at each of the target levels and offered as options to customers, where the options may be identified or described by their caffeine level. In other embodiments, customers may select exact caffeine levels prior to brewing, and the coffee may be brewed to the exact caffeine level input by the customer. In some embodiments, the selection of a caffeine level may be received from a customer on a touchscreen or by voice command. The customer input may be processed by a computer system to control brewing or creation of the coffee. The coffee may be fresh brewed or created by soluble coffee.

What is claimed is:

1. A computer-controlled method for making coffee with a precise quantity of caffeine comprising:
    extracting a portion of caffeinated coffee;
    extracting a portion of decaffeinated coffee;
    measuring, using a computer-controlled process, the caffeine content of the caffeinated coffee to an accuracy within 1 milligram;
    measuring, using a computer-controlled process, the caffeine content of the decaffeinated coffee to an accuracy within 1 milligram;
    retrieving a target caffeine content;
    blending, using a computer-controlled process, the caffeinated coffee and decaffeinated coffee in a proportion to create a blend having the target caffeine content within 1 milligram of accuracy.

2. The method of claim 1 wherein extracting the caffeinated and decaffeinated coffee comprises using a cold-brew method.

3. The method of claim 1 wherein extracting the caffeinated and decaffeinated coffee comprises using a full immersion brew method.

4. The method of claim 1 wherein extracting the caffeinated and decaffeinated coffee comprises using percolation.

5. The method of claim 1 wherein the decaffeinated coffee is created using a solvent-based process.

6. The method of claim 1 wherein the decaffeinated coffee is created using a non-solvent based process.

7. The method of claim 1 wherein measuring the caffeine content is performed by using spectrophotometry.

8. The method of claim 1 wherein measuring the caffeine content is performed by using high performance liquid chromatography (HPLC).

9. The method of claim 1 wherein measuring the caffeine content is performed by using gas chromatography (GC).

10. A computer-controlled method for making coffee with a precise quantity of caffeine comprising:
    decaffeinating a first portion of coffee beans;
    roasting the first portion of coffee beans;
    grinding the first portion of roasted coffee beans;
    brewing the first portion of roasted coffee bean grounds with water to create a first portion of coffee;
    filtering said first portion of coffee;
    roasting a second portion of coffee beans;
    grinding the second portion of roasted coffee beans;
    brewing the second portion of roasted coffee bean grounds with water to create a second portion of coffee;
    filtering said second portion of coffee with a coffee filter;
    measuring, using a computer-controlled process, the caffeine content of the caffeinated coffee to an accuracy within 0.001 milligrams;
    measuring, using a computer-controlled process, the caffeine content of the decaffeinated coffee to an accuracy within 0.001 milligrams;
    retrieving a target caffeine content;
    calculating, using a computer-controlled process, a proportion of the caffeinated coffee to the decaffeinated coffee, where combining the caffeinated coffee and decaffeinated coffee in the proportion results in a blend having the target caffeine content within 0.001 milligrams of accuracy;
    blending, using a computer-controlled process, the caffeinated coffee and decaffeinated coffee in the proportion to create the blend having the target caffeine content within 0.001 milligrams of accuracy.

11. The method of claim 10 wherein brewing the first and second portions of coffee is performed by using a cold-brew method.

12. The method of claim 10 wherein brewing the first and second portions of coffee is performed through a full immersion method.

13. The method of claim 10 wherein brewing the first and second portions of coffee is performed by using percolation.

14. The method of claim 10 wherein filtering of the first and second portions of coffee is performed by using a paper-based coffee filter.

15. The method of claim 10 wherein filtering of the first and second portions of coffee is performed by using a French press.

16. The method of claim 10 wherein filtering of the first and second portions of coffee is performed by using a portafilter.

17. The method claim 10 wherein decaffeinating is performed by using a solvent-based process.

18. The method of claim 10 wherein decaffeinating is performed by using a non-solvent based process.

19. The method of claim 10 wherein measuring the caffeine content is performed by using spectrophotometry.

20. The method of claim 10 wherein measuring the caffeine content is performed by using high performance liquid chromatography (HPLC).

21. The method of claim 10 wherein measuring the caffeine content is performed by using gas chromatography (GC).

* * * * *